United States Patent

Bandemer

[15] 3,651,624
[45] Mar. 28, 1972

[54] COTTON HARVESTER

[72] Inventor: Martin E. Bandemer, Pine Bluff, Ark.

[73] Assignee: Ben Pearson Manufacturing Company, Pine Bluff, Ark.

[22] Filed: May 12, 1970

[21] Appl. No.: 36,556

[52] U.S. Cl. ..................................56/28, 56/2, 56/13.3, 56/30, 56/36, 56/97
[51] Int. Cl. .......................................A01d 45/18
[58] Field of Search ....................56/13.3, 28-50, 56/96, 97

[56] References Cited

UNITED STATES PATENTS

| | | | |
|---|---|---|---|
| 1,689,443 | 10/1928 | MacGregor | 56/13.3 |
| 2,765,612 | 10/1956 | Raumaker et al. | 56/2 X |
| 2,509,970 | 5/1950 | Edmonds | 56/13.3 X |
| 2,715,809 | 8/1955 | Buell | 56/28 |

Primary Examiner—Louis G. Mancene
Assistant Examiner—J. A. Oliff
Attorney—John R. Walker, III

[57] ABSTRACT

A self-propelled machine used to harvest seed cotton. The machine includes a forward assembly comprising a modified crop pickup header having a reciprocating sickle knife, a rotating bat reel and an auger conveyor, a pair of modified conventional cotton picking head assemblies arranged in a tandem relationship, each having been turned 90° about their respective horizontal axis so as to assume a horizontal position as opposed to the usual vertical position, a conventional shreader, a pair of typical delivery fans, the usual receptacle basket, and a conventional prime mover.

18 Claims, 13 Drawing Figures

Patented March 28, 1972

INVENTOR.
MARTIN E. BANDEMER
BY John R. Walker, III
Attorney

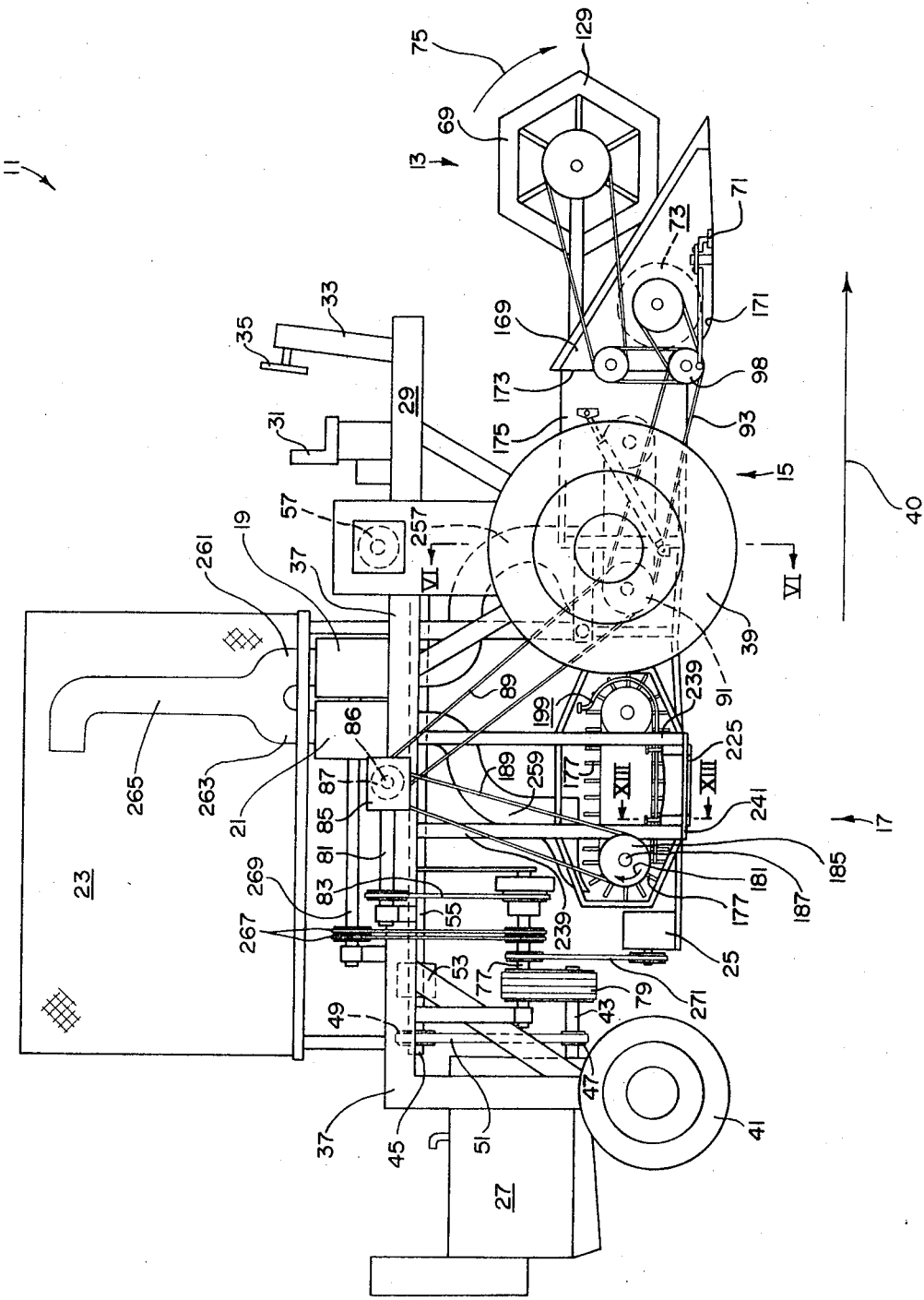

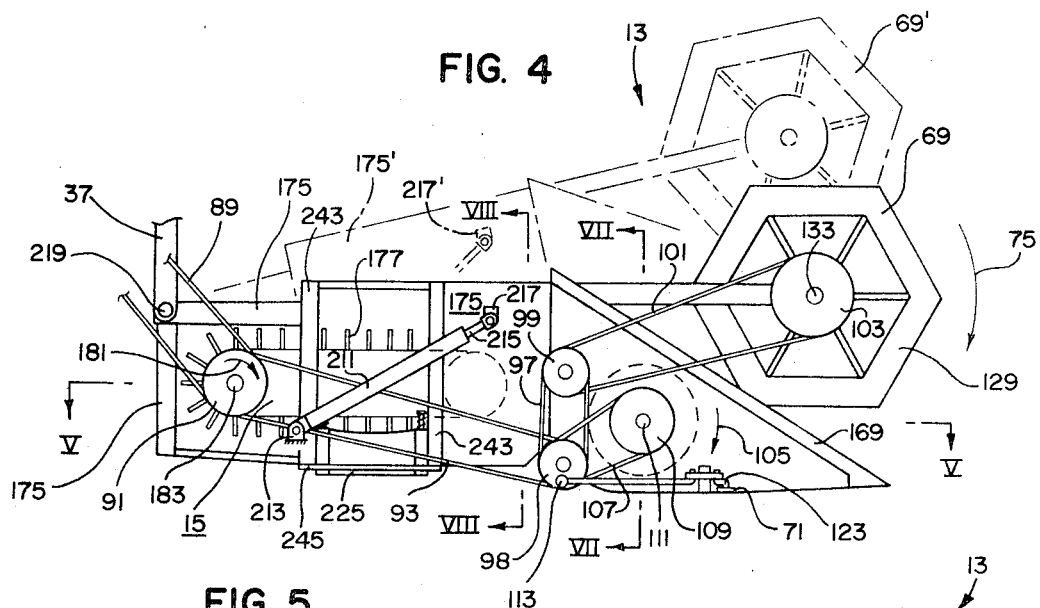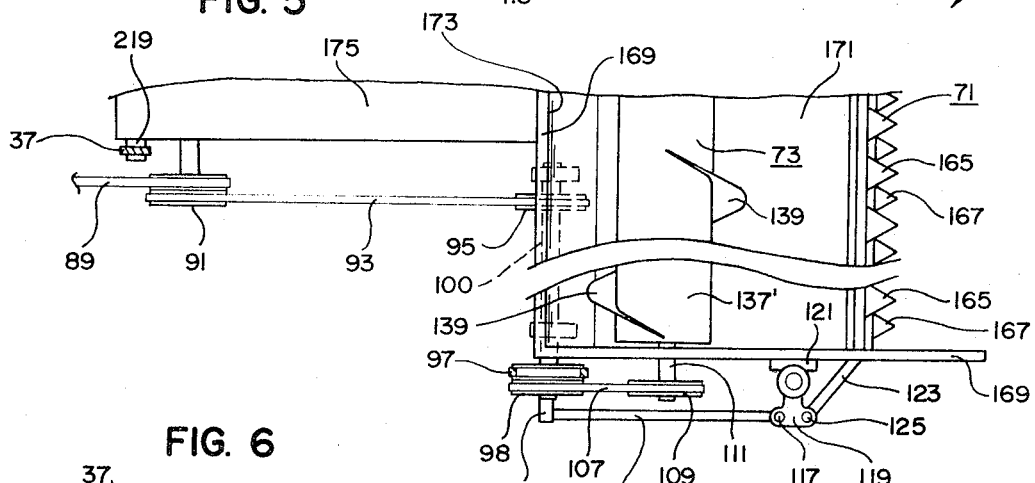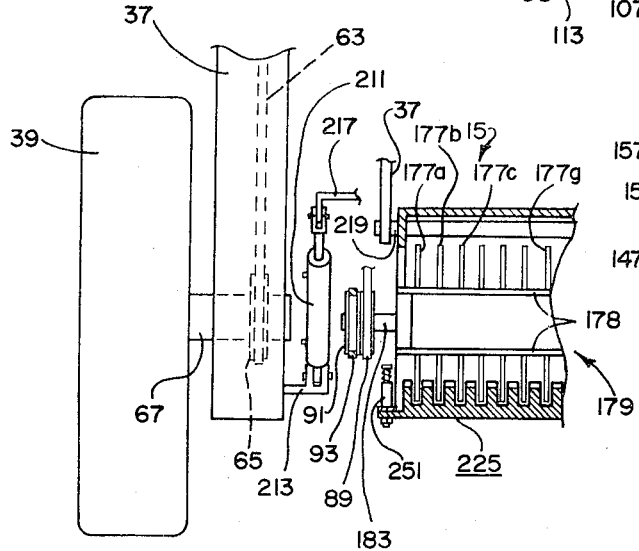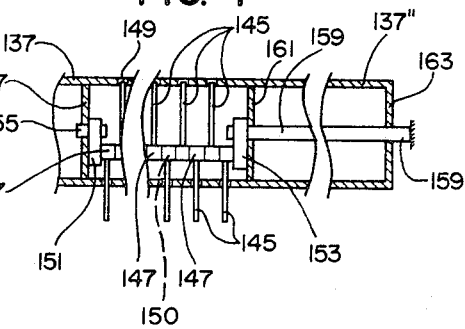
INVENTOR.
MARTIN E. BANDEMER
BY John R. Walker, III
Attorney

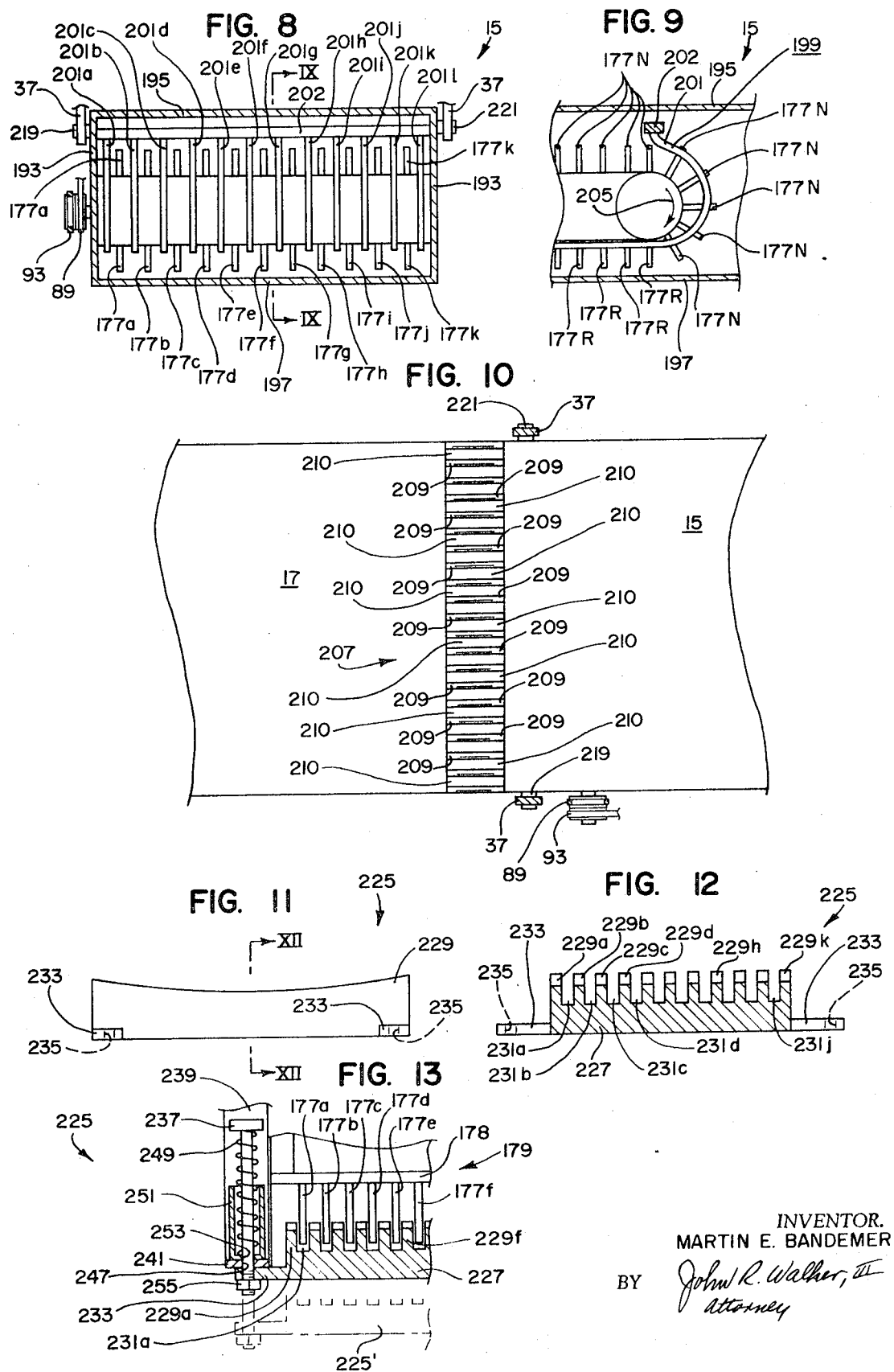

COTTON HARVESTER

BACKGROUND OF THE INVENTION

1. Field of the Invention

This invention pertains to the field of cotton harvesters, and, more specifically, to a harvester utilizing the rotary spindle picker.

2. Description of the Prior Art

The cotton picker most prevalent in the recent past is of the type which straddles and passes over a row of cotton plants and crowds the cotton plants against a picking head assembly where a plurality of rotating spindles pick the locks of cotton as the machine traverses along the row. The loaded spindles pass through a controlled area that strips the cotton locks from the spindles and a delivery fan picks up the cotton locks and conveys them through delivery pipes to a basket.

This method of cotton picking leaves the stalk standing and has certain disadvantages:

a. Since the machine must straddle the row of cotton, the picking assemblies and their respective coacting crowders, i.e., structure for crowding the plants against the picking spindles, must be driven and supported from above. This means that the crowder structure on one side of the row extends downwardly toward the ground as does picking structure on the other side of the row, both of which are supported from the machine structure substantially at two points.

b. The cotton grower must pass over his entire field several times. In other words a cotton grower normally expects to harvest approximately 60–75 percent of the open cotton on the initial or "first picking." He follows this up, 2 to 4 weeks later, with a "second picking" so as to harvest the remaining portion left from the "first picking" plus the additional open cotton that may have matured in the meantime. Additionally, he must cover the field for the third time to drive a stalk shreader over the ground. The stalk shreader severs the cotton plant and shreds it into a residue that is evenly distributed over the field and is used as an organic fertilizer.

The disadvantages of the two point suspension are:

a. The resiliency of the cotton plants causes the downward directed structure to flare, i.e., the distance between the crowder and the picker increases toward the ground. The result is that some low hanging cotton locks may remain unpicked as the cotton picker passes over the row. Obviously, this adversely affects the optimum yield of the harvest.

b. The flare places undue stress and strain upon the support structure for the crowder and the picker, creating frequent maintenance problems.

The art of cotton harvesting which comprised severing the stalks of the plants was developed prior to the turn of the century, as is evidenced by the Wright U.S. Pat. No. 339,725 and the Baker U.S. Pat. No. 459,623. Other patents known to the applicant which involve severing the cotton plants are: The Purnell U.S. Pat. No. 779,965; the MacGregor U.S. Pat. No. 1,689,443; and the Edmonds U.S. Pat. No. 2,509,970. From the best information available to the applicant, none of the above patents resulted in successful marketing or competition with the hand picker, and none of the above patents suggest or disclose the structure of the present invention.

The Keck Implement Co., Brawley, Calif., has marketed a machine which severs the cotton stalks and operated in conjunction with a Rust type cotton picker. The Keck machine comprises adapting a mowing machine sickle bar ahead of a conventional cotton picking assembly that is mounted in the typical orientation, i.e., the usual vertical position. This principle tends to compound the tendency of flare. The Keck machine harvests a relatively narrow swath, i.e., 3 or 4 feet, in relation to that of the present invention, e.g. 13 feet, and is void of a conveying system to facilitate moving the severed cotton plant toward the picking assembly. However, it is doubtful that a conveying system would be feasable in the Keck machine in view of the following: The Keck machine has a further disadvantage in that after the stalks have been severed they gravitate downwardly and bunch up at the lower end of the picking assembly, i.e., the stalks are not distributed up and down the workable surface of the picking assembly, resulting in it being greatly limited in the amount of cotton that it is capable of harvesting.

The technique of severing and picking up grain stocks in the art of harvesting of wheat or the like is usually accomplished with a machine known in the harvesting art as a combine. A typical combine includes among many other machine elements a crop pickup header comprising a reciprocating sickle knife, a rotating bat reel and an auger conveyor. However, the use of a crop pickup header in the art of harvesting cotton, insofar as the extent of the applicant's knowledge, is completely new.

SUMMARY OF THE INVENTION

The present invention is directed towards overcoming the above mentioned and other aforementioned disadvantages in prior cotton harvesters by providing a machine which will harvest cotton having substantially a 35 percent gin turnout, i.e., 1,400 pounds of seed cotton yielding a 500-pound bale of lint cotton. Additionally, the machine of the present invention will harvest, in one swath, e.g., eight rows of variable row planted cotton, i.e., four double rows 40 inches apart with variable rows planted 12 inches to 14 inches apart. Further, the machine of the present invention will harvest drilled cotton, i.e., high population cotton plants oftentimes erroneously referred to as broadcast cotton wherein the rows are drill planted with a 6-inch or 7-inch span between rows so that the cotton plants substantially cover the entire cotton field. In this latter instance, the machine of the present invention will harvest 22 rows simultaneously, or harvest any number of rows simultaneously depending on the span between rows and the width of the header employed.

Conventional cotton pickers usually harvest two rows, in one swath, spaced from 36 inches to 40 inches apart. The conventional cotton picker has rather massive row heads which must travel between the cotton rows, therefore, dictating the span between the rows. The machine of the present invention will harvest a conventional planting of cotton, i.e., 40 inch rows with variable rows 12 inches to 14 inches apart, at a greatly reduced cost. Additionally, the machine of the present invention, when used to harvest drilled cotton, makes it possible to greatly increase the yield of seed cotton per acre, i.e., because the grower can plant more cotton plants on any given size field.

The machine of the present invention introduces a new concept to the field of cotton harvesting and includes a forward assembly comprising a modified crop pickup header having a reciprocating sickle knife for severing the cotton stalks a short distance above the surface of the earth, a rotating bat reel having a variable speed drive assembly and structure for remotely raising and lowering the forward assembly to better facilitate harvesting the different heights of cotton plants. The header includes an auger conveyor comprising an elongated tubular member with oppositely wound helical grooves having a function of moving the cotton toward the center of the auger, i.e., from right to left toward the center and from left to right toward the center. Situated adjacent the center of the auger and forming an integral part thereof are a group of retractable fingers radially arranged around the circumference of the auger having a feature of protruding when being directed forwardly and downwardly as the auger rotates and retracting when directed rearwardly and upwardly. Thus the severed cotton plants are received from the outer ends of the rotating auger conveyor and moved rearwardly to the next processing element, namely, the forward picking assembly.

The cotton harvester of the present invention includes a pair of modified conventional cotton picking head assemblies having structure similar to the row heads of a conventional cotton picker. The picking assemblies are arranged in a tandem relationship, i.e., one forward and one rearward, each having been turned 90° about their respective horizontal axis so as to assume a horizontal position as opposed to the usual vertical position. The picking assemblies are of the rotating spindle type, i.e., an elongated spindle that spins about its longitudinal axis as it is caused to travel adjacent a crowder assembly, e.g., comparable to the earth rotating about its axis while it travels through space along its orbit around the sun. The spindles, having barblike gripping portions, snag the cotton fibers and literally pull them from the boll of the cotton plant. The spindles are supported by a flexible beltlike assembly which moves each spindle along a generated course or track having a predetermined shape which may be likened to the earth's orbit about the sun.

The spindles engage structure causing them to rotate about their respective axis during a relatively short span of their travel. In this regard, the spindles are made use of for a new and additional function. The spindles of the picking assemblies of the machine of the present invention rakingly gather in the crop of cotton plants as it is brought in from the header. It should be understood that the spindles are not rotating at this particular time and a wraparound stalk guard has been incorporated with the picking assembly to facilitate this function and will be fully described later in this disclosure. The cotton plants first pass through the forward picking assembly and then move on rearward to the rear picking assembly which has identical structure as the forward picking assembly and functions in a like manner.

The spindles, after having wound the seed cotton from the boll, pass on to a stripper which removes the seed cotton fibers from the spindles adjacent the influence of a strong current of air. A strong current of air is created by a pair of typical delivery fans which pick up the seed cotton fibers and deliver them to a typical receptacle basket. The stalks, immature bolls, empty bolls, stubble and stems of the cotton plants are received aft of the rearward picking assembly by a typical shredder. The shredder comprises high velocity rotary knives which shred the remains of the cotton plant and discharges the shreds therefrom rearwardly so that they may be utilized as an organic fertilizer.

The cotton harvester of the present invention makes it possible for a cotton grower to substantially double his yield per acre, i.e., converting to high population of cotton plants, for example, 110,000 to 200,000 plants per acre, and at the same time harvest an acre of high population cotton plants with a savings in operation time of his equipment and manpower. This is because: first, the harvester is harvesting a wider swath with each pass. Secondly, the picking assemblies and the delivery fans are constantly operating at an optimum rpm. Thirdly, the cotton plants are severed and shredded simultaneously with the one picking operation which eliminates two additional trips over the field to accomplish the same purpose. In other words, only one pass over the field is necessary with the present invention as opposed to the three passes necessary with previous pickers, i.e., two for the cotton picking and one for the shredding.

The advantages of the cotton harvester of the present invention are:

a. The spindles accomplish the work of moving the cotton plant rearward, allowing the cotton harvester to travel at a higher ground speed, particularly through shorter cotton plants or through lower density yield cotton plants.

b. The picking assemblies have a better distribution of cotton plants. The previous conventional cotton harvesters had to pick the locks of cotton fiber at the point above the ground that nature placed the boll. The harvester of the present invention substantially distributes the cotton bolls evenly across the picking tunnel or crowder door.

c. The picking assembly is more efficient, i.e., to the extent that the usual burr and/or boll extractors are eliminated, harvesting a grade of lint cotton having a 35 percent gin turnout. This is comparable to prior cotton harvesters requiring burr and/or boll extractors.

d. Flare is eliminated resulting in picking a higher percentage of the available cotton bolls, i.e., not neglecting the low hanging cotton bolls.

e. The stress on the support structure from flare is eliminated, resulting in less maintenance to the equipment.

f. High population cotton plants, e.g., 110,000 to 200,000 plants per acre, may be economically harvested.

g. Uniform pressure on the stalks as they move through the crowder resulting in picking a higher percentage of the locks of cotton fiber.

h. It will harvest narrow row cotton and the second picking is eliminated. The plant breeder can now use seed which will enable the cotton plant to more nearly grow as nature intended, i.e., the plants are close together, they do not grow as large and they bear fewer bolls, however, the significant point is that the these bolls all substantially mature within a few days of each other. Accordingly, the picking will harvest the entire crop, thus eliminating the second picking. Heretofore, since the massive machine had to pass between the rows, the plant breeders object was to develop a cotton plant that would have a larger quantity of bolls per plant, however, these plants have the disadvantage of having 50 days or more between maturity dates of the bolls on any given plant, accounting for the necessity of a second picking.

i. The cotton plants are in effect picked twice, i.e., the cotton plants must pass through the forward picking assembly and then through the rearward picking assembly, resulting in picking a higher percentage of the available cotton bolls.

j. The ground speed may be varied independent from the remaining operative structure so as to maintain the fans and the picking assemblies at their optimum capacity. The picking assemblies inherently have a predetermined RPM which is optimum or most efficient, as opposed to an rpm which is too high, that would result in the rotating spindles skipping some of the locks of cotton fiber and as opposed to the opposite extreme, an rpm which is too low which would likewise have an adverse effect upon the yield. The ground speed of cotton pickers heretofore was synchronized with the speed of the picking assemblies, accordingly, regardless of how thin the crop might be, the ground speed could not be changed appreciably without adversely affecting the optimum efficiency.

k. The usual cotton harvesters heretofore passed above the cotton plant leaving it standing after having been picked. This required that additional equipment cover the field a second time to cut the stalks and stems into a residue. The machine of the present invention simultaneously accomplishes this same task, and with only one swath.

BRIEF DESCRIPTION OF THE DRAWINGS

FIG. 3 is a side elevational view, with portions removed for purposes of clarity.

FIG. 4 is a somewhat schematic side view of the front part of the harvester, showing it in broken lines in a raised position.

FIG. 5 is a partial sectional view taken as on the line V—V of FIG. 4.

FIG. 6 is a sectional view taken as on the line VI—VI of FIG. 3.

FIG. 7 is a fragmentary sectional view taken as on the line VII—VII of FIG. 4.

FIG. 8 is a sectional view taken as on the line VIII—VIII of FIG. 4.

FIG. 9 is a partial sectional view taken as on the line IX—IX of FIG. 8.

FIG. 10 is a plan view taken from a point directly above the junction of the tandem picking assemblies.

FIG. 11 is a side elevational view of the crowder door, in a disassociated environment.

FIG. 12 is a sectional view taken as on the line XII—XII of FIG. 11.

FIG. 13 is a sectional view taken as on the line XIII—XIII of FIG. 3.

DESCRIPTION OF THE PREFERRED EMBODIMENT

Figure 1:
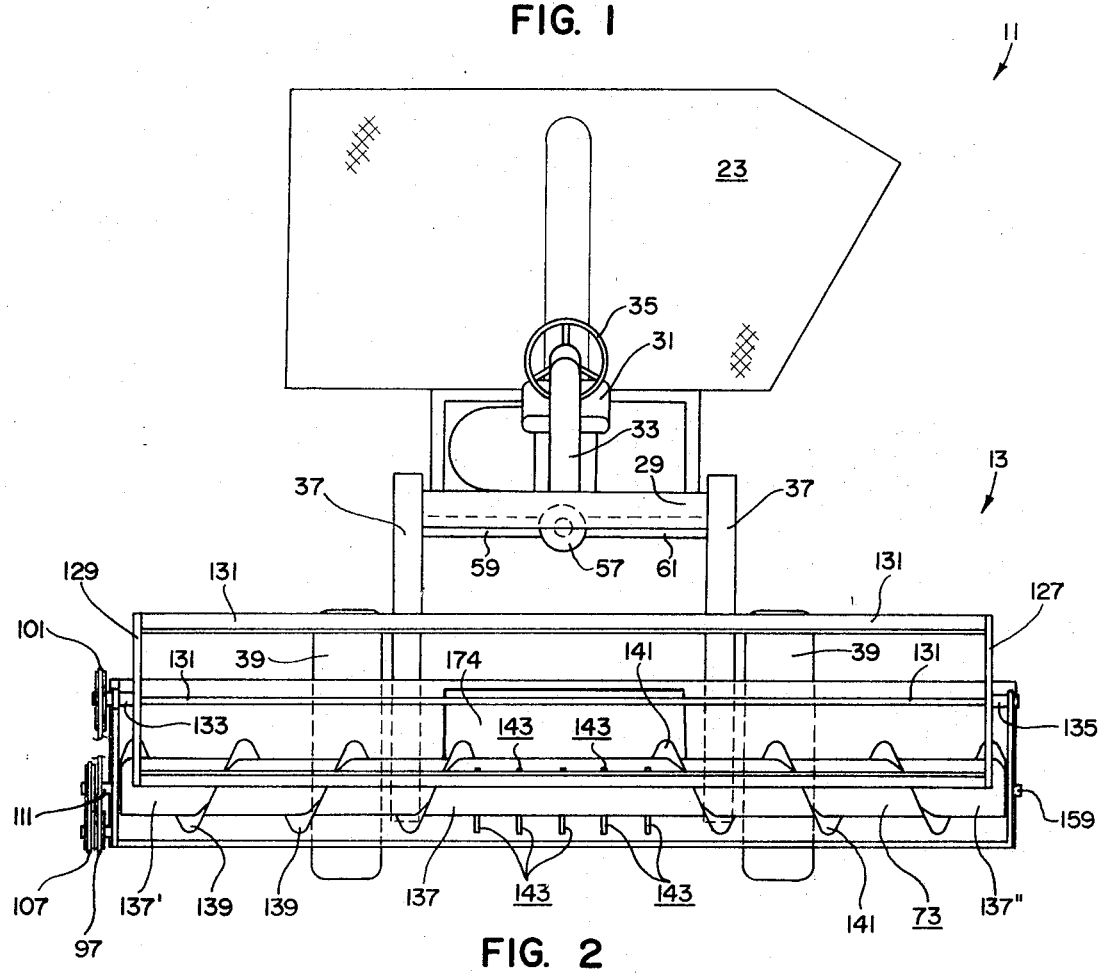
FIG. 1 is a front elevational view of the harvester.

The cotton harvester machine of the present invention, character referenced by the numeral 11, comprises in general a crop pickup header 13, a pair of modified conventional cotton picking head assemblies, i.e., a forward assembly 15 and a rearward assembly 17, a pair of typical delivery fans, i.e., a forward fan 19 and a rearward fan 21, the usual receptacle basket 23, a conventional shredder 25, and a conventional prime mover 27. From FIG. 3 of the drawings, it may be seen that the machine 11 includes a typical operator's platform 29 which supports the usual seat 31 and a control column 33, the upper end of which supports a typical steering wheel 35. It should be understood that the operator (not shown) while sitting in the seat 31 has, in addition to the steering wheel 35, numerous controls (not shown) and instruments (not shown) at his command for monitoring pertinent data and remotely controlling through an electrical system (not shown), a hydraulic system (not shown) and/or mechanical linkage (not shown) including clutch engagement structure and a braking system as required and obvious to those skilled in the art.

The machine 11, having a usual frame 37, is suspended above the ground by four wheels, two rather large forward wheels 39 (only one is shown in FIG. 3) and two smaller rearward wheels 41 (only one shown in FIG. 3).

The forward wheels 39, preferably having tires with a typical lug tread, drive the machine 11 over the surface of the earth in the direction of the arrow 40. The drive train for the wheels 39, commencing at the prime mover 27 (FIGS. 3), comprises a rotating crank shaft 43 which rotatably drives a journaled drive shaft 45 through the sprockets 47,49 and the endless roller chain 51. The drive train for the machine 11 also includes a dual range variable speed gearbox 53 having a rotatably driven input from the drive shaft 45 and an output through the main drive shaft 55 which extends forwardly to a differential 57. From FIG. 1 of the drawings, it may be seen that the differential 57 is positioned substantially midway between the forward drive wheels 39 and that a pair of axles 59,61 extend laterally outwardly from the differential 57. At the outermost ends of the respective axles 59,61 are a pair of sprockets (not shown) which respectively drive a pair of endless roller chains 63 which extend vertically downwardly respectively to sprockets 65 (one of which is shown in FIG. 6). Each sprocket 65 (FIG. 6) rotatably drives a journaled axle 67 having a wheel 39 removably attached outwardly thereof in a typical manner, e.g., lug nuts, etc.

The prime mover 27, preferably being an internal combustion engine, is intended to operate at a constant rpm for reasons which will be more apparent when the remaining structure has been disclosed. The dual range variable speed gearbox 53 enables the operator as for example to vary the ground speed of the machine 11 from less than 1 mile per hour to approximately 3 miles per hour in the one range and from less than 3 miles per hour to an excess of 5 miles per hour in the second range without affecting the constant r.p.m. of the prime mover 27.

The crop pickup header 13, being positioned forward of the machine 11 (FIG. 3), comprises a rotating bat reel 69, a reciprocating sickle knife 71 and an auger conveyor 73. From FIG. 3 of the drawing it may be seen that the bat reel 69, rotating in the direction of the arrow 75, is driven by a drive train which is coupled to the prime mover 27. The drive train for the pickup header 13, starting at the prime mover 27, comprises the crank shaft 43 rotatably driving a journaled power take-off shaft 77 through a plurality of V-belts 79 which frictionally engage suitable respective pulleys. The power take-off shaft 77 rotatably drives a journaled shaft 81 by an endless roller chain 83 engaging suitable respective sprockets. The drive shaft 81 is the rotatable input for a gearbox 85, having a 90° displaced output shaft 86 which rotatably drives a double sprocket 87. An endless roller chain 89 engages one track of the double sprocket 87 and one track of a second double sprocket 91. An endless roller chain 93 engages the other track of the second double sprocket 91 and a sprocket 95 (FIG. 5). From FIGS. 4 and 5 of the drawings it may be seen that a V-belt 97 frictionally engages one track of a double pulley 98, which is mounted on and rotatably driven by a journaled shaft 100, and rotatably drives a variable drive assembly 99. A V-belt 101 frictionally engages the variable drive portion of the variable drive assembly 99 and rotatably drives the bat reel 69 through a pulley 103.

The auger conveyor 73 rotates in the direction of the arrow 105 (FIG. 4) and is rotatably driven by a V-belt 107 FIGS. 4 and 5) frictionally engaging the other track of the double pulley 98 and a pulley 109 which is fixedly attached to a journaled shaft 111. The reciprocating sickle knife 71 is power driven by an eccentrically positioned drive rod 113 which is fixedly attached to the double pulley 98, substantially as viewed in FIGS. 4 and 5. One end of a pitman arm 115 pivots about the drive rod 113 and the other end is pivotally attached to a bell crank 119 at a pivot point 117. The bell crank 119 pivots about suitable support structure 121. One end of a knife connecting link 123 pivots about the other side of the bell crank 119 at a pivot point 125. The other end of the link 123 is securely attached to the sickle knife 71 in a suitable manner, i.e., bolts and nuts not shown. The variable drive assembly 99 enables the operator to remotely vary the rpm of the bat reel 69 while the prime mover 27 maintains a constant rpm, for reasons which will be more apparent when the remaining structure has been disclosed.

From FIGS. 1,3 and 4 of the drawings, it may be seen that the bat reel 69 comprises a respective left and right bat support wheel 127,129 and a plurality of elongated flat-like bat members 131, preferably formed from metal or the like. Each bat member 131 extends from the left wheel 127 to the right wheel 129. It should be understood that the left side of the harvester 11 is to the operator's left as though he were sitting in the seat 31 and that the right side is to his right. The right bat support wheel 129 is fixedly attached to a journaled shaft 133 which is in turn fixedly attached to the pulley 103 (FIG. 4). The pulley 103 rotatably drives the right bat support wheel 129 in a manner just described. The left bat support wheel 127 pivots about a support shaft 135 as the pulley 103 rotates. From FIG. 2 of the drawings, it may be seen that the bat members 131 are arranged so that an extension of the respective surfaces thereof converges inwardly at a central axis about which the support wheels 127,129 rotate.

From FIGS. 1,5 and 7 of the drawings, it may be seen that the auger conveyor 73 comprises an elongated tubular cylindrical member 137 horizontally disposed having a right end 137' and a left end 137", a helical wound platelike member 139 extending along the right end 137', the internal circumjacent edges thereof being fixedly attached, as by welding or the like, to the outer circumferential surface of the tubular member 137 so as to establish helical grooves which are inwardly directed as the auger conveyor 73 is rotated in the direction of the arrow 105 (FIG. 4), a helical wound platelike member 141 extending along the left end 137' having the internal circumferential edges thereof fixedly attached, as by welding or the like, to the outer circumferential surface of the tubular member 137 so as to establish helical grooves which are directed inwardly as the auger conveyor 73 is rotated in the direction of the arrow 105 (FIG. 4) and a plurality of retractable finger assemblies 143 positioned between the two members 139,141 substantially as illustrated in FIG. 1.

From FIG. 7 of the drawings, it may be seen that the retractable finger assemblies 143 individually comprise an elongated rod 145 fixedly attached at the one end, as by welding or the like, to a short section of tubular steel 147 or the like and that the rods 145 extend through a respective aperture 149 in the tubular member 137. Further, the tubular sections 147 encircle and engage an elongated immobilized offset shaft 150 and are free to pivot about shaft 150 as the tubular member 137 is rotated. Offset shaft 150 is straddled longitudinally by a pair of support members 151,153. The support member 151 is supported by a relatively short stationary shaft 155 having a portion thereof protruding through a concentrically positioned aperture in a circular disk 157. The support member 153 is supported by an elongated stationary shaft 159 which extends through a concentric aperture in an adjacent circular disk 161 and a concentric aperture in a closure disk 163. It should be understood that the three disks 157, 161, 163 rotate about the respective stationary shafts 155,159 as the tubular member 137 rotates. Further, it may be seen in FIG. 2 that the rod 145 of the retractable finger assemblies 143 protrude outwardly from the tubular member 137 progressively further as the rods 145 point forwardly and downwardly and that the rods 145 progressively retract as they rotatably pivot rearwardly. From FIG. 5 of the drawings, it may be seen that the shaft 111, adjacent the right end 137' of the tubular member 137 being fixedly attached to a closure disk (not shown), adjacent the outermost edge of the member 137, as by welding or the like, rotatably drives the tubular member 137 in the direction of the arrow 105 (FIG. 4).

From FIGS. 3,4 and 5 of the drawings, it may be seen that the reciprocating sickle knife 71 comprises an elongated over-serrated reciprocating blade 165 and a stationary blade 167 extending along the length thereof. The reciprocating blade 165 is power-operated from the prime mover 27 through a drive train previously described, wherein the knife connecting link 123 drives the reciprocating blade 165 to and fro.

The pickup header 13 includes a frame structure 169, which suitably supports the components just described, having a platelike bottom portion 171 substantially along the length of the tubular member 137 and an elongated curved up portion 30 beneath the auger conveyor 73, substantially as illustrated in FIG. 3. A rearward vertical wall 173 of header 13 has a rectangular shaped throat 174 positioned aft of the retractable finger assembly 143. The frame structure 169 also includes suitable flanges, lugs and/or brackets (not shown) for attaching the pickup header 13 to a frame structure 175 that supports the forward picking head assembly 15.

The structure and the function of the forward picking head assembly 15 is identical to that of the rearward picking head assembly 17 and the basic structure is well known to those skilled in the art, for example, the Gray et al. U.S. Pat. No. 2,943,431, discloses the structure of picking head assemblies. Therefore, it is believed that a detailed disclosure of the picking head assemblies 15, 17 in this application would be redundant. Accordingly, only those innovative changes and/or modifications to the picking head assemblies 15,17 and the parts related thereto will be included in this specification.

It should be understood that the conventional picking head assemblies 15,17 each comprise a slat-chain assembly 179 having two endless roller chains (not shown) parallel one with the other in a spaced apart relationship and arranged in oblong loops so as to engage respective drive sprockets (not shown) at the one end of the respective loops and idler sprockets (not shown) at the other end of the respective loops. The slat-chain assembly 179 also includes an endless series of slats 178 which are straddled between the above mentioned roller chains with each end thereof removably attached to one of the respective roller chains and are carried with said chains as they are driven about the above mentioned sprockets. The Rust U.S. Pat. No. 2,665,536, discloses drive structure for the slat-chain assembly 179. The Gray et al. U.S. Pat. No. 2,943,431, discloses further details of the picking head assemblies 15,17.

A plurality (or a row) of picking spindles 177 are individually rotatably attached to each slat 178, as best viewed in FIGS. 6 and 13. A plurality of the articulated adjacent slats 178, having their respective longitudinal axis substantially parallel one with the other, extend along the length of the endless roller chains (not shown). The spindles 177 are rotatably attached to each slat 178 at an equal interval so that the first spindle 177a on each of the many slats 178 is in alignment one with the many other spindles 177a, the second spindle 177b on each of the slats 178 is in alignment with the other spindles 177b and etc., etc. so as to form many endless series of picking spindles 177. FIGS. 3,4 and 9 of the drawings depict only one endless series of picking spindles 177, with this one series being in alignment with several other series. FIGS. 6,8 and 13 depict the several endless series of spindles 177 wherein the first series in character referenced by the numeral 177 and the letter suffix a, the second series by the numeral 177 and the letter suffix b, the third by the numeral 177 and the letter suffix c, etc., etc.

In operation, the slat-chain assemblies 179 of the respective picking assemblies 15,17 of the present invention are driven in the direction of the arrow 181 (FIGS. 3 and 4). Each of the spindles 177 have a drive roller (not shown) adjacent the root end and when the slat-chain assembly 179 is driven, the drive roller (not shown) rollingly engages a rubber faced track (not shown) having a length determined by the span between the axles (not shown) of the drive sprocket (not shown) and the idler sprocket (not shown). In other words, the spindles 177 are moved along an orbit by the slat-chain assembly 179 and are caused to rotate about their respective longitudinal axes as they pass through a segment of the orbit, e.g., as shown in the Rust U.S. Pat. No. 2,665,536. It will be understood that the term slat-chain assembly 179 as used herein, includes not only the slats 178 per se but also the upper and lower chains, not shown, to which the slats 178 per se are attached at the upper and lower ends thereof.

From FIGS. 3 and 6 of the drawings, it may be seen that the slat-chain assembly 179 of the forward picking assembly 15, being driven by the afore-mentioned drive sprocket (not shown), is driven by the double sprocket 91 through a rotatable shaft 183 by the endless roller chain 89 engaging one track of the double sprocket 87, through a drive train previously described. Further, the slat-chain assembly 179 of the rearward picking assembly 17, is driven by a drive sprocket (not shown) but which is driven by a sprocket 185 through a rotatable drive shaft 187 by an endless roller chain 189 engaging the sprocket 185 and one track of the double sprocket 87.

An important feature of the present invention is that the picking assemblies 15,17 are orientated in a horizontal position, i.e., with the axes of revolution of the slat-chain assembly 179 horizontal, as opposed to the conventional vertical position, and are arranged in a tandem relationship one with the other, i.e., as opposed to the conventional abreast relationship. Additionally, the picking assemblies 15,17 of the present invention each receive, in turn, the bulk of a cotton plant 191 so that in effect each plant 191 is exposed to the picking process for a second time, i.e., as opposed to the conventional cotton picker having two picking assemblies abreast so that one picks exclusively from one row of cotton plants 191 and the other picks exclusively from a second row of cotton plants 191.

From FIG. 9 of the drawings, it may be seen that the spindles 177 rotate only as they are traveling rearwardly, i.e., the distance between the leading and trailing axles (not shown) of the respective idler and drive sprockets (not shown). The rotating spindles are character referenced by the numeral 177 and the letter suffix R and the non-rotating spindles are character referenced by the numeral 177 and the letter suffix N.

From FIG. 8 of the drawings, it may be seen that the picking assembly 15 is enclosed with a pair of side panels 193, an upper panel 195, and a lower floor-like panel 197, the rearward picking assembly 17 is, of course, also enclosed with like panels (not shown). FIGS. 8 and 9 of the drawings clearly show a wraparound stalk guard 199 which prevents substantially any portion of the cotton plant 191 from entering the upper portion of the picking assemblies 15,17. Additionally, the stalk guard 199 obviates cotton fibers 203 from being wound about the respective root ends of the spindles 177R or in other words the portion of the spindles 177R adjacent their respective slat 178. The root end of the spindles 177N preferably are kept free of cotton fibers 203 to permit the strippers (not shown) to properly engage the spindles 177N for removing the cotton fibers 203 therefrom. Further, the stalk guard 199 guidingly realigns a bent or misaligned spindle 177.

The stalk guard 199 comprises a series of suspended members 201 formed from bar steel or the like and are shaped somewhat like a sickle when viewed from the side, as in FIG. 9. The remaining series of suspended members 201 are in alignment with the suspended member 201, as viewed in FIG. 9 and are character referenced in FIG. 8 by the numeral 201 and a letter suffix *a* for the first member, the numeral 201 and letter suffix *b* for the second, and the numeral 201 and the letter suffix *c* for the third, etc. It should be understood that the individual members 201 are fixedly attached, as by welding or the like, to a traverse holding member 202 and extend downwardly therefrom being alternated between two respective adjacent series of picking spindles 177. The traverse holding member 202 extends horizontally between the two side panels 193 (FIG. 8) and is fixedly attached thereto, as by welding or the like.

The picking assemblies 15,17 when associated in their conventional environment were utilized exclusively for picking cotton fibers 203 from the cotton plants 191. However, the picking assemblies 15,17 of the present invention, while accomplishing the same general function, are additionally utilized for a new and useful purpose, i.e., grasping the stalks of the cotton plants 191 and forcing them downward and rearwardly thence moving them horizontally as the picking spindles 177R pick the fibers 203. The forward picking assembly 15 normally receives the severed cotton plants 191 directly from the throat 174 in the panel 173 of the pickup header 13, however, an alternate configuration, which will be fully described herein, involves interposing structure between the throat 174 and the header 13. FIG. 9 shows the spindles 177 being moved in the direction of the arrow 205 wherein the non-rotating spindles 177N protrude progressively further outwardly from the stalk guard 199 as they are moved downwardly, assuring positive delivery rearwardly of the severed cotton plants 191. The rearward picking assembly 17 receives the stalks of the cotton plats 191 after they have first passed through the forward picking assembly 15. The spindles 177 and the stalk guard 199 for the rear picking assembly have like structure and function identically as just described for the forward picking assembly 15.

The floor panel 197 of the forward picking assembly 15 terminates a predetermined distance prior to reaching the floor panel 197 of the rearward picking assembly 17. From FIG. 10 of the drawings, it may be seen that this span between the two floor panels 197, 197 is occupied by a grate pan 207. The grate pan 207 comprises a series of small diameter rodlike members 209 positioned so that the longitudinal axes thereof are parallel one with the other as well as with the longitudinal axis of the cotton harvester 11.

The rodlike members 209, being symmetrically arranged, are fixedly attached, as by welding or the like, to the floor panel 197 of the rear picking assembly 17 and extend forwardly to a continguous engagement with the floor panel 197 of the forward picking assembly 15, for reasons which will be more apparent when the remaining structure has been disclosed. However, in this regard, a space 210 is formed between the rodlike members 209 and being predetermined in size allows debris, i.e., sand, dirt particles and/or small pieces of stalk and stems from the cotton plants 191, to fall through to the surface of the earth as the bulk of the meterial is conveyed thereon from the forward picking assembly 15 to the rearward picking assembly 17.

From FIG. 4 of the drawings, it may be seen that the pickup header 13 and the forward picking assembly 15, being fixedly attached one with the other in any well known manner, e.g., bolts and nuts (not shown) may be remotely raised and lowered by the operator. In this regard, the bat reel 69 is depicted in a raised position by broken lines and character referenced by the numeral 69' and the raised frame structure 175 supporting the forward picking assembly 15 is depicted in broken lines and character referenced by the numeral 175.

It should be understood that, if desired, the forward and rearward picking assemblies 15,17 may both be stationary, i.e., rigidly mounted. Additionally, the pickup header 13 may be mounted so as to pivot independent of the remaining structure, i.e., raised and lowered, without departing from the spirit and scope of the present invention. Further, the picking assemblies 15,17 may be mounted in a sloped position, i.e., as opposed to the illustrated parallel with the ground position, or more clearly stated, sloped downwardly and forwardly so the crop is being moved rearwardly and being slightly elevated simultaneously.

With the embodiment shown a hydraulic cylinder 211 is employed to provide the lifting force necessary to raise the pickup header 13 and the picking assembly 15. The hydraulic cylinder 211 is typically attached to a suitably designed stationary support lug 213 (FIG. 6) and the actuating rod 215 is pivotally attached to a movable support lug 217. The stationary support lug 213 is fixedly attached, as by welding or the like, to suitable support structure (FIG. 6) forming an integral part of the rigid frame 37 of the harvester 11. The movable support lug 217 is fixedly attached, as by welding or the like, to the frame structure 175 of the forward picking assembly 15. The lug 217 is depicted in broken lines when the cylinder 211 is extended, i.e., the pickup header 13 and the picking assembly 15 being in the raised position, and is character referenced by the numeral 217'.

The pickup header 13 and the forward picking assembly 15, being rigid one with the other, are pivotally supported to the rigid frame 37 of the harvester 11 by a pair of trunions 219,221, as best viewed in FIGS. 4,5,8 and 10. It should be understood that the members 209 of the grate pan 207 extend forwardly a short distance beyond the aft edge of the floor panel 197 of the forward picking assembly 15 and contiguously engage the floor panel 197 as the pick up header 13 and the forward picking assembly 15 rotate about the traunions 219,221. In other words, a portion of the grate pan 207 is ever present between the two picking assemblies 15,17 regardless of the elevation of the bat reel 69.

The conventional cotton harvester, having picking assemblies abreast and vertically disposed, is constructed so that the picking assemblies are on one side of two respective rows of cotton plants 191 and a suspended crowder door assembly is on the other side of the two respective rows of cotton plants 191. The cotton harvester travels down the rows of cotton plants 191 and the crowder doors substantially force the cotton plants 191 against the respective picking assemblies, enabling the spindles to pick the cotton fiber from the cotton plants 191.

Since the respective picking assemblies of the conventional cotton harvester and the crowder doors jointly must straddle the row of cotton plants 191, the picking assemblies and the crowder door are suspended from suitable frame structure and supported at the upper ends thereof usually at two points. This two point suspension presents problems in that the resiliency of the cotton plants 191 eventually causes a flare between the respective picking assemblies and their respective crowder doors, resulting in the low hanging cotton bolls 223 being neglected by the picking assemblies, accordingly, adversely affecting the overall yield per acre. Additionally, the stresses created on the support structure by the aforementioned flare generates additional maintenance and expense in repairing the machine.

The cotton harvester of the present invention obviates this problem by: first, laying the picking assemblies 15,17 on their respective sides, i.e., horizontally disposed as opposed to the usual vertical position. This enables the picking assemblies 15,17 to be rigidly secured adjacent each corner thereof to the frame structure 175.

Secondly, an improved crowder door assembly 225 (FIG. 12) is herewith disclosed comprising a horizontal platelike member 227 having a series of vertically disposed platelike members 229 symmetrically arranged and parallel one with the other fixedly attached, as by welding or the like, thereto.

From FIGS. 12 and 13 of the drawings, it may be seen that the first vertically disposed plate member 229 is character referenced by the numeral 229 and the letter suffix a, the second like member is character referenced by the numeral 229 and the letter suffix b, the third like member is character referenced by the numeral 229 and the letter suffix c, etc.

An elongated channel 231 is formed by the space between respective adjacent platelike members 229. The first such channel is character referenced in FIGS. 12 and 13 by the numeral 231 and the letter suffix a, the second channel by the numeral 231 and the letter suffix b, the third channel by the numeral 231 and the letter suffix c, etc. Accordingly, a portion of the picking spindles 177a pass through the channel 231a, the picking spindles 177b pass through the channel 231b, the picking spindles 177c pass through the channel 231c, etc.

It should be understood that each of the picking spindles 177 rotate about their respective longitudinal axes as they pass through their respective channels 231. Further, it is not intended that this disclosure be limited to any particular number of channels 231 of the crowder door 225, nor should it be limited in the number of series of picking spindles 177, the FIGS. of the drawings being intended to be illustrative only. In other words, FIG. 8 of the drawings shows 11 endless series of picking spindles 177 whereas in actual practice, there are generally more endless series of picking spindles 177 that are grouped into a picking assembly 15. Accordingly, it is the intent of this invention that the stalk guard 199 have at least as many members 201 as the picking assembly 15 has endless series of picking spindles 177, and preferably one more. Further, the crowder door 225 will have at least as many channels 231 as there are endless series of picking spindles 177 for the particular picking assembly 15.

The crowder door 225 also includes attaching structure comprising a plurality (preferably four) supporting lugs 233 which are fixedly attached, as by welding or the like, to the horizontal member 227 and in the same plane as the member 227 adjacent the respective corners thereof, substantially as illustrated in FIGS. 11, 12 and 13. Each lug 233 has a suitably sized and centrally aligned aperture 235 for receiving an attachment bolt 237.

Before proceeding with the description of the attachment structure of the crowder door 225, it should first be made clear that from FIGS. 3 and 4 of the drawings, it may be seen that the frame 37 of the harvester 11 comprises at least four tubular vertically disposed members 239, i.e., two on the left and two on the right side, each substantially parallel one with the other, and at least two horizontal platelike support members 241, i.e., one on each side (only one shown). The members 239, being fixedly attached to the frame 37 of the harvester 11 as by welding or the like, extend downwardly therefrom terminating a short distance above the surface of the earth. One of the two horizontal platelike members 241, having the surface thereof substantially parallel with the surface of the earth, interconnects the lower ends of the two members 239 on the left side of the harvester 11. The other horizontal platelike member 241 interconnects, in like manner, the lower ends of the two members 239 on the right side of the harvester 11.

Further, the frame structure 175 for the forward picking assembly 15 includes at least four tubular vertically disposed members 243 (FIG. 4), i.e., two on the left and two on the right side (only two shown), and two horizontal platelike support members 245, i.e., one on each side and only one shown. The members 243, being fixedly attached to the frame structure 175 for the forward picking assembly 15 as by welding or the like, extends downwardly therefrom terminating a short distance above the surface of the earth. One of the two horizontal platelike members 245, having the surface thereof substantially parallel with the surface of the earth, interconnects the lower ends of the two members 241 on the left side of the picking assembly 15. The other horizontal platelike member 245 interconnects, in like manner, the lower ends of the two members 245 on the right side of the picking assembly 15.

It will be understood that the frame structure may be a lower frame structure adjacent the ground, i.e., for both picking assemblies 15, 17. In this configuration the picking assemblies 15, 17 are mounted superjacent the lateral members of this lower frame structure (not shown).

The crowder door 225 for the forward picking assembly 15 is identical to the crowder door 225 for the rearward picking assembly 17 and the method of attaching the two crowder doors 225 is like wise identical. The following description of attaching the crowder door 225 pertains to the rearward picking assembly 17 and more particularly to one of at least four securing points, i.e., the right rear corner thereof as illustrated in FIG. 13. Accordingly, the following description is intended to encompass each attachment point for both the crowder doors 225.

The crowder door 225 is positioned with the longitudinal axes of the channels 231 substantially parallel with the longitudinal axis of the harvester 11 having the vertical platelike members 229 directed upwardly, as viewed in FIG. 13. The supporting lugs 233 overlap subjacent a portion of the surface of the horizontal support member 241. The member 241 has a suitably sized and aligned aperture 247 thereon for receiving the attachment bolt 237. A compression spring 249 convolutely encircles the shaft portion of the bolt 237 with the upper end thereof resting against the shoulder of the head portion of the bolt. The lower portion of the spring 249 is encircled circumferentially by an elongated tubular cuplike spring guide 251 having an inner diameter of sufficient size to freely slidably circumjacently receive the spring 249 so that the lower end thereof rests within the spring guide 251. The spring guide 251, having a floor like portion, has a suitably sized concentric aperture 253 in the floorlike portion for receiving the shank portion of the bolt 237. The lower surface of the floorlike portion of the guide 251 contiguously engages the support member 241 and is secured in place by the bolt 237. The bolt 237 is secured in any well known manner, e.g., an elastic stop nut 255. The springs 249 bias the crowder door 225 upwardly so that the cotton plants 191 are urged to move through the channels 231 thereof, thus assuring positive picking of the locks of cotton fibers 203 from the cotton bolls 223. The springs 249 permit the crowder door 225 to shift vertically in the event the bulk of the cotton plants 191 becomes increasingly great.

The four point suspension of the crowder door 225, i.e., as opposed to the conventional two point suspension, assures more uniform pressure distribution over the entire surface thereof. The conventional cotton harvester, having its picking assemblies in a vertical position on one side of the rows of cotton plants 191 and its crowder on the other side, have a tendency to flare, as heretofore described, causing the crowder door to lose pressure adjacent the low hanging cotton bolls 223.

It should be understood that the crowder door 225 of the present invention, having a four point spring biased suspension, will maintain a constant pressure over the entire surface thereof since the crowder door 225 is free to float up and down depending upon the bulk of the cotton plants 191 that the spindles 177 are feeding through the picking assembly 15. In this regard, the crowder door 225 is depicted in a displaced position in FIG. 13 by broken lines and is character referenced by the numeral 225', however, it should be understood that the horizontal plate 227 of the crowder door 225 does not necessarily maintain a constant parallel relationship with the slat 178.

The picking assemblies 15, 17 include the usual stripper mechanism (not shown), e.g., like that shown in the Gray et al. U.S. Pat. No. 2,943,431, which strip the locks of cotton fibers 203 from the spindles 177. The delivery fans 19, 21 are of a material handling type, e.g., the Bush U.S. Pat. No. 2,633,390, having respective inlet ducts 257, 259, respective exhausts ducts 261, 263 which converge at a Y junction feeding into a single exhaust duct 265, as best viewed in FIG. 3. The inlet duct 257, communicating the forward picking assembly 15 with the fan 19, has a telescoping section (not shown) superjacent the picking assembly 15 to facilitate raising and lowering of the picking assembly 15. The inlet duct 259, communicating the rearward picking assembly 17 with the fan 21, is, of course, rigid throughout since the assembly 17 is stationary.

From FIG. 3 of the drawings, it may be seen that the fans 19,21 are driven through a drive train from the power takeoff shaft 77 by a pair of V-belts 267 which frictionally engage suitable pulleys so as to rotate the journaled shaft 269 that, in turn, drives the fans 19,21 at a constant rpm. The respective stripper assemblies (not shown) are adjacent the influence of a strong current of air which is generated by the respective fans 19,21. Accordingly, the locks of cotton fibers 203 are picked up by the strong current of air immediately after being removed from the spindles 177 and are delivered from the picking assemblies 15,17 to the usual receptacle basket 23.

The stalks and stems from the cotton plants 191 are moved rearward from the picking assembly 17 by the spindles 177 and are received by the shredder 25. The shredder 25 is of any suitable construction known to those skilled in the art and preferably is a dynamically balanced high velocity rotor type, e.g., like the heavy duty chopper manufactured by the Hesston Corporation, Hesston, Kan., and is driven from the power takeoff shaft 77 through a drive belt 271 frictionally engaging suitable V-pulleys. The shredder reduces the stalks and stems 273 to an evenly-chopped residue 275 and scatters it over the harvested field. The residue 275 quickly decomposes and returns organic matter to the soil which aids in building the soil.

With the ever-increasing cost per acre in fertilizers, insect control, and defoliage chemicals, a distinct advantage can be achieved from growing a high population of cotton plants per acre, e.g., 110,000 to 200,000 plants to the acre. Obviously, the cost for treating an acre of ground is sustained whether there be 40,000 plants or 200,000 plants, therefore, it is most desirable to plant as many cotton plants to the acre as can be economically and/or profitably harvested. Cotton harvesters have heretofore restricted the population of cotton plants since the massive picking assemblies must pass between the rows of cotton plants. The cotton harvester 11 of the present invention is capable of harvesting cotton regardless of how close the rows may be. A preferred spacing of drilled cotton is seven inches between rows which generally amounts 110,000 to 200,000 plants to the acre. The cotton harvester 11 of the present invention is capable of harvesting any number of variable rows simultaneously, e.g., 22 rows when planted 7 inches between rows using a 13-foot cutting swath.

Heretofore the ground speed of the cotton harvester was synchronized with the speed of the fans and picking assemblies. The prime mover 27 of the cotton harvester 11 of the present invention maintains a constant rpm so that the picking assemblies 15,17 and the delivery fans 19,21 may be operated at the most efficient speed and in addition the ground speed of the harvester 11 may be varied depending on the height of the cotton plants 191, the thickness of them, and the density of the yield, i.e., the ground speed through a cotton field having a high yield would be less than it would in a field having a low yield. Additionally, the r.p.m. of the bat reel 69 is increased, again while maintaining a constant r.p.m. of the prime mover 27, when the cotton plants 191 are short and is decreased when the cotton plants 191 are tall. Also, the r.p.m. of the bat reel 69 preferably is increased when the ground speed is increased, and preferably is slowed down when the ground speed decreases.

Figure 2:
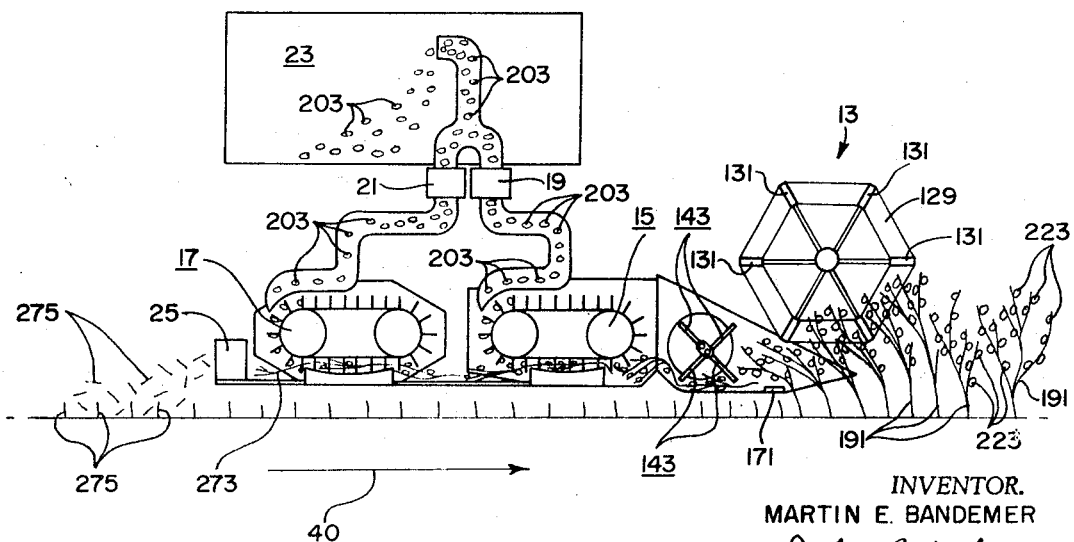
FIG. 2 is a schematic side view thereof.

From FIG. 2 of the drawing, it may be seen that the bat 131 of the pickup header 13 holds the cotton plants 191 against the sickle knife 171 to aid in cutting the cotton plant 191. Just when the cotton plant 191 is cut off, the bat 131 causes the plant 191 to lean toward the auger conveyor 73 so that the cotton plant 191 will gravitate into the helical grooves generated by the members 139,141 of the auger conveyor 73. The constant repetition of another bat 131 moving to a superjacent position in respect to the auger conveyor 73 assures that the cotton plants 191 are conveyed centrally of the auger conveyor 73. The retractable fingers 143 receive the entire bulk of the cotton plants 191 and moves them into the forward picking assembly 15.

It will be understood that, if desired, more than one feeder beater, i.e., sets of retractable finger assemblies 143, may be employed to effectively compensate for an increase in distance between the auger conveyor 73 and the spindles 177. This increase in distance is anticipated when the alternate configuration is employed, i.e., the forward picking assembly 15 being rigidly mounted as heretofore described and the pickup header 13 being pivotally mounted to the stationary picking assembly 15 so as to facilitate raising and lowering of the header 13 independent of the picking assembly 15. The additional feeder beater assemblies would preferably be interposed between the throat 174 of the header 13 and the forward picking assembly 15.

The spindles 177 of the forward picking assembly 15 force the cotton plants 191 downwardly and rearwardly through the first picking tunnel or crowder door 225. The rotating picking spindles 177R (FIG. 9) pull the locks of cotton fiber 203 from the bolls 223 of the cotton plant 191 and the stripper (not shown) strips the locks of cotton fiber 203 from the spindles 177. The fan 19 pulls the locks of cotton fiber 203 from the area of the stripper (not shown) and delivers them to the receptacle basket 23. The cotton plants 191 are forcibly moved rearward by the spindles 177 past the grate pan 207 where debris may gravitate outwardly to the ground. The spindles 177 of the rearward picking assembly 17 urge the cotton plants downwardly and rearwardly through the picking tunnel or crowder door 225 where the rotating spindles 177R (FIG. 9) pull the locks of cotton fiber 203 from the cotton bolls 223 of the cotton plants 191 assuring that substantially all the locks of cotton fiber 203 are picked. The stalks and stems 273 are urged into the shredder 25 by the spindles 177 where they are chopped into a residue 275 that is substantially evenly distributed over the harvested cotton field.

An important feature of the present invention is the unsynchronization of the moving sub-assemblies in respect to the ground speed of the harvester 11, i.e., the prime mover 27 is operated at a constant rpm which maintains the delivery fans 19,21, the picking assemblies 15,17, the auger conveyor 73 and the sickle knife 71 at a constant speed, while at the same time the ground speed of the harvester 11 can be independently varied as well as the rpm of the bat reel 69.

When using the cotton harvester 11 of the present invention, the operator, may increase or decrease the ground speed of the harvester 11, depending on the height of the cotton plants 191, the population of the cotton plants and the density of the yield. When the ground speed is increased, it is preferable that the r.p.m. of the bat reel 69 be increased. However, the r.p.m. of the auger 73, the delivery fans 19,21 and the picking assemblies 15,17 will remain constant. The ground speed of the harvester 11 is increased for short cotton plants 191 and is decreased when harvesting tall cotton plants 191. Additionally, the height of the pickup header 13 may be raised when harvesting tall cotton plants 191 and may be lowered when harvesting shorter cotton plants 191. These variations, of course, are discriminately accomplished remotely by the operator.

Although the invention has been described and illustrated with respect to a preferred embodiment thereof, it is to be understood that it is not to be so limited since changes and modifications may be made therein which are within the full intended scope of this invention.

I claim:

1. A harvester for cotton comprising a frame, means movably supporting said frame for moving said frame over a field of cotton bearing stalks, a crop pick-up header mounted from said frame adjacent the forward end thereof for cutting the cotton bearing stalks, at least one cotton picking assembly mounted from said frame and oriented in a horizontal position for receiving the cotton bearing stalks from said pick-up header, drive means coupled to said cotton picking assembly for the actuation thereof, said cotton picking assembly including a plurality of outwardly extending rotating cotton picking means rotating about their respective longitudinal axes and crowder means in a substantially horizontal disposition below said rotating cotton picking means for crowding the cotton bearing stalks towards said cotton picking means for the picking of the cotton from the cut stalks.

2. The harvester of claim 1 which includes at least another cotton picking assembly mounted from said frame in tandem relationship relative to said one cotton picking assembly for receiving the unpicked cotton from said one cotton picking assembly and for the picking thereof, and drive means coupled to said another cotton picking assembly for the actuation thereof.

3. The harvester of claim 2 which includes a plurality of spaced apart rod-like members extending between said one cotton picking assembly and said another cotton picking assembly to provide support means for the unpicked cotton in passing from said one cotton picking assembly to said another cotton picking assembly and to allow dirt, debris, and the like to fall therethrough.

4. The harvester of claim 1 in which said crop pick-up header includes a rearward vertical wall provided substantially medially thereof with a throat opening leading to said cotton picking assembly, a bottom portion extending forwardly from the lower edge of said vertical wall, sickle knife means disposed adjacent the forward edge of said bottom portion for cutting the cotton bearing stalks and rotating auger means disposed rearwardly of said sickle knife means and including oppositely wound helical means adjacent opposite ends thereof for moving the cut cotton bearing stalks laterally towards said throat opening.

5. The harvester of claim 4 in which said crop pick-up header includes a plurality of retractable finger assemblies adjacent the mid-portion thereof for urging the cut stalks rearwardly beneath said auger means towards said throat opening, and in which said crop pick-up header includes rotating bat reel means disposed above said sickle knife means and including a plurality of bat members for engaging the cotton bearing stalks and urging them against said sickle knife means for the cutting thereof.

6. The harvester of claim 1 in which said crowder means includes a substantially horizontal crowder door and means resiliently supporting said crowder door for downward yielding movement of said crowder door relative to said cotton picking means.

7. The harvester of claim 6 in which said means resiliently supporting said crowder door includes a plurality of spring means disposed at spaced apart places on said crowder door to permit yielding downward movement of said crowder door at any angle.

8. The harvester of claim 1 which includes a plurality of side-by-side and spaced stalk guard means extending from a place in the upper part of said cotton picking assembly around the front part thereof into progressively close adjacency to the inward ends of said cotton picking means and then extending rearwardly in said cotton picking assembly adjacent the inward ends of said cotton picking means.

9. The harvester of claim 1 which includes shredder means mounted rearwardly of said cotton picking assembly to receive the stalks therefrom for chopping the stalks into a residue and for depositing the chopped stalks onto the ground.

10. A harvester for cotton comprising a frame, wheels rotatably mounted from said frame for movement of said harvester over a field of cotton bearing stalks, a prime mover mounted on said frame, variable means coupling said prime mover to at least one of said wheels for moving said harvester over a field of cotton bearing stalks at selected speeds independent of the speed of said said prime mover, a crop pick-up header mounted from said frame adjacent the forward end thereof for cutting the cotton bearing stalks, at least one cotton picking assembly mounted on said frame and oriented in a horizontal position for receiving the cotton bearing stalks from said pick-up header and for the picking of the cotton from the cut stalks, means for coupling said prime mover to said cotton picking assembly for the drive thereof independent of the speed of said harvester over the ground.

11. The harvester of claim 10 which includes at least another cotton picking assembly mounted from said frame in tandem relationship relative to said one cotton picking assembly for receiving the unpicked cotton from said one cotton picking assembly and for the picking thereof, and drive means coupled to said another cotton picking assembly for the actuation thereof independent of the speed of said harvester over the ground.

12. The harvester of claim 11 in which each of said cotton picking assemblies includes a plurality of rotating cotton picking means and crowder means in a substantially horizontal disposition below said rotating cotton picking means for crowding the cotton bearing stalks towards said cotton picking means for the picking of the cotton from the cut stalks.

13. The harvester of claim 12 in which said crop pick-up header includes a rearward wall provided with a throat opening leading to said cotton picking assembly, sickle knife means for cutting the cotton bearing stalks, rotatable bat reel means disposed above said sickle knife means including a plurality of bat members for engaging the cotton bearing stalks and urging them against said sickle knife means for the cutting thereof, and auger means rearwardly of said knife sickle means and said bat reel means for moving the cut cotton bearing stalks laterally towards said throat opening.

14. The harvester of claim 13 which includes coupling means operably coupled between said prime mover and said crop pick-up header for driving said sickle-knife means, said bat reel means and said auger means independently of the speed of said harvester over the ground, and said coupling means including variable means for selectively and independently varying the rotation of said bat reel means.

15. The harvester of claim 14 in which said crowder means includes a substantially horizontal crowder door and means resiliently supporting said crowder door for downward yielding movement of said crowder door relative to said cotton picking means.

16. The harvester of claim 15 in which said means resiliently supporting said crowder door includes a plurality of spring means disposed at spaced apart places on said crowder door to permit yielding downward movement of said crowder door at any angle.

17. The harvester of claim 16 which includes shredder means mounted rearwardly of said another of said cotton picking assemblies to receive the stalks therefrom for chopping the stalks into a residue and for depositing the chopped stalks onto the ground.

18. The harvester of claim 17 which includes a cotton receptacle basket, duct means leading from said cotton picking assemblies to said basket, fan means interposed in said duct means for moving the picked cotton from said cotton picking assemblies through said duct means into said basket and means coupling said fan means to said prime mover for the drive of said fan means independent of the speed of said harvester over the ground.

* * * * *